US012633831B2

(12) United States Patent
Dai

(10) Patent No.: US 12,633,831 B2
(45) Date of Patent: May 19, 2026

(54) SERIES CAPACITOR BUCK CONVERTER WITH PRECHARGE CIRCUIT

(71) Applicant: Hubei JND Technology Group Co., Ltd, Huangshi (CN)

(72) Inventor: Chonghui Dai, Shanghai (CN)

( * ) Notice: Subject to any disclaimer, the term of this patent is extended or adjusted under 35 U.S.C. 154(b) by 137 days.

(21) Appl. No.: 18/514,427

(22) Filed: Nov. 20, 2023

(65) Prior Publication Data

US 2024/0178757 A1 May 30, 2024

(30) Foreign Application Priority Data

Nov. 30, 2022 (CN) .......................... 202211515151.1

(51) Int. Cl.
| | |
|---|---|
| *H02M 3/158* | (2006.01) |
| *H02M 1/00* | (2006.01) |
| *H02M 3/07* | (2006.01) |

(52) U.S. Cl.
CPC ......... *H02M 3/158* (2013.01); *H02M 1/0003* (2021.05); *H02M 1/0095* (2021.05); *H02M 3/07* (2013.01)

(58) Field of Classification Search
CPC .... H02M 3/158; H02M 3/155; H02M 3/1552; H02M 3/1555; H02M 3/156; H02M 3/157; H02M 3/1582; H02M 3/1584; H02M 3/07; H02M 3/04; H02M 3/06; H02M 3/071; H02M 3/072; H02M 3/077; H02M 1/0003; H02M 1/0006; H02M 1/0009; H02M 1/0095
See application file for complete search history.

(56) References Cited

U.S. PATENT DOCUMENTS

2021/0083575 A1* 3/2021 Jin .......................... H02M 1/08
2022/0069705 A1* 3/2022 Kim ...................... H02M 3/158

FOREIGN PATENT DOCUMENTS

| CN | 112532051 A | 3/2021 |
| CN | 216751217 U | 6/2022 |

* cited by examiner

*Primary Examiner* — Nguyen Tran
(74) *Attorney, Agent, or Firm* — Nitin Kaushik

(57) ABSTRACT

Disclosed is a series capacitor buck converter with a precharge circuit. The converter includes a switch device unit, a series capacitor, an output inductor, a switch control unit, and a capacitor precharge circuit, etc. The switch control unit is configured to control the switch on and off of a switch unit in the power conversion unit to achieve power conversion; the capacitor precharge circuit includes a capacitor voltage detection circuit configured to detect a voltage at both ends of the series capacitor, and a capacitor charge circuit configured to precharge the series capacitor through a charge switch device in a pulse width modulation control mode, and the current limiting resistor is connected in series with the charge switch device to suppress a transient large current when the charge switch device is switched on.

11 Claims, 11 Drawing Sheets

1

SERIES CAPACITOR BUCK CONVERTER WITH PRECHARGE CIRCUIT

CROSS-REFERENCE TO RELATED APPLICATIONS

The application claims priority to Chinese patent application No. 202211515151.1, filed on Nov. 30, 2022, the entire contents of which are incorporated herein by reference.

TECHNICAL FIELD

The present disclosure relates to a non-isolated buck converter, in particular to a series capacitor buck converter with a precharge circuit.

BACKGROUND

Non-isolated buck converters have been widely used in various scenarios in the field of information communications. The gain of a traditional non-isolated buck converter circuit (buck) is Vout=Vin×D, where Vin and Vout are the input voltage and the output voltage respectively, and D is the duty cycle. In some applications, the difference between the input voltage Vin and the output voltage Vout is large, and the duty cycle D of the conversion circuit will be correspondingly smaller, which will lead to greater losses of switch devices and inductors in the conversion circuit, limiting the efficiency and power density of the converter.

SUMMARY

In order to solve the above problems, the present disclosure proposes a series capacitor buck converter with a precharge circuit.

The technical solution for achieving the object of the present disclosure is to provide a series capacitor buck converter with a precharge circuit, including:

a power conversion unit, including a first half bridge unit, a second half bridge unit, a series capacitor and an output inductor, wherein a first high side switch device unit, the series capacitor, and a first low side switch unit are sequentially connected in series to form a first half bridge unit, a connection point between the series capacitor and the first low side switch unit being a first switch node, and a connection point between the series capacitor and the first high side switch unit being a series capacitor node; a second high side switch device unit and a second low side switch unit are connected to form a second half bridge unit, a connection point between the second high side switch device unit and the second low side switch unit being a second switch node, the first high side switch unit and the second high side switch unit being respectively connected to an input positive electrode and the series capacitor node, and the first low side switch unit and the second low side switch unit being connected to an input negative electrode; one end of a first output inductor and a second output inductor is respectively connected to the first switch node and the second switch node, and the other end thereof is connected to an output positive electrode;

a switch control unit, configured to control the switch on and off of a switch unit in the power conversion unit to achieve power conversion;

a capacitor precharge circuit, including a capacitor voltage detection circuit configured to detect a voltage at both ends of the series capacitor, and a capacitor charge circuit configured to precharge the series capacitor through a charge switch device in a pulse width modulation control mode.

Preferably, the switch control unit controls a switch device unit by providing two groups of control signals, each group of control signals including two paths of control signals, and the two paths of control signals of each group being in a complementary relationship, wherein a first path of control signals of a first group of control signals are configured to control the first high side switch device unit, and a second path of control signals are configured to control the first low side switch device unit; a first path of control signals of a second group of control signals are configured to control the second high side switch device unit, and a second path of control signals are configured to control the second low side switch device unit, and the first path of control signals of the second group of control signals are 180° phase shifted from the first path of control signals of the first group of control signals, and the second path of control signals of the second group of control signals are 180° phase shifted from the second path of control signals of the first group of control signals.

Preferably, the capacitor voltage detection circuit includes a differential circuit, a filter circuit and an amplification circuit, wherein a voltage at both ends of the series capacitor is sampled by the differential circuit and is provided to the capacitor charge circuit after filtering and amplification.

Preferably, the capacitor voltage detection circuit includes a first resistor, a second resistor, a third resistor, an operational amplification circuit and a feedback resistor, wherein one end of the first resistor is connected to a positive electrode of the series capacitor, and the other end is connected to one end of the third resistor and a positive input end of the operational amplification circuit, and the other end of the third resistor is grounded; one end of the second resistor is connected to a negative electrode of the series capacitor, and the other end is connected to a negative input end of the operational amplification circuit and one end of the feedback resistor, and the other end of the feedback resistor is connected to an output end of the operational amplifier.

The capacitor charge circuit includes a charge switch circuit and a charge control circuit, wherein the charge control circuit outputs at least one path of control signals according to a signal provided by the capacitor voltage detection circuit, and control the switch on and off of a switch unit in the charge switch circuit in a pulse width modulation mode, so a voltage value at both ends of the series capacitor reach a target value.

Preferably, the capacitor voltage detection circuit further includes a comparator and a voltage source, wherein a positive input end of the comparator is connected to an output end of the operational amplification circuit, a negative input end is connected to a positive electrode of the voltage source, and a negative electrode of the voltage source is grounded.

Preferably, a pulse width of a control signal output by the charge control circuit is kept constant at a fixed width or is adjusted according to a voltage signal of the series capacitor.

Preferably, an energy source for charging the charge switch circuit is from an input end of a power converter, and the charge switch circuit includes at least one charge switch unit and a current limiting resistor, wherein the current limiting resistor is connected in series with the charge switch unit and is configured to suppress a transient large current when the switch device is switched on.

Preferably, the switch unit in the charge switch circuit is a separate charge switch device, or is a multiplexing of switch devices in the power conversion unit during a pre-charge stage, or both.

Preferably, the target value of a voltage at both ends of the series capacitor is half of a voltage at an input end of the power converter.

Compared with the prior art, the present disclosure has the following advantages: the duty cycle of the power converter may be increased, and thus the efficiency of the power converter may be improved: and the effect of charging the series capacitor on the power conversion unit may be avoided effectively by precharging the series capacitor.

Other features and advantages of the present disclosure will be set forth in subsequent description, and in part will be apparent from the description, or may be learned by practice of the present disclosure. The objectives and other advantages of the present disclosure may be achieved and attained by the structure particularly pointed out in the written description and claims hereof as well as the appended drawings.

BRIEF DESCRIPTION OF DRAWINGS

The drawings are only for purposes of illustrating specific embodiments and are not to be construed as limiting the present disclosure, and like reference numerals refer to like parts throughout.

DETAILED DESCRIPTION OF THE EMBODIMENTS

It will be readily understood that many implementations of the present disclosure may be devised by those skilled in the art according to the technical solution of the present disclosure without departing from the spirit of the present disclosure. Accordingly, the following detailed description and drawings are merely illustrative of the technical solution of the present disclosure and are not to be construed as an exhaustive or limiting the technical solution of the present disclosure. Rather, these embodiments are provided so that those skilled in the art may more fully understand the present disclosure. Hereinafter, preferred embodiments of the present disclosure will be described in detail with reference to the accompanying drawings. The accompanying drawings, which are incorporated in and constitute a part of the present disclosure, together with embodiments of the present disclosure serve to illustrate the inventive concept of the present disclosure.

Figure 1:
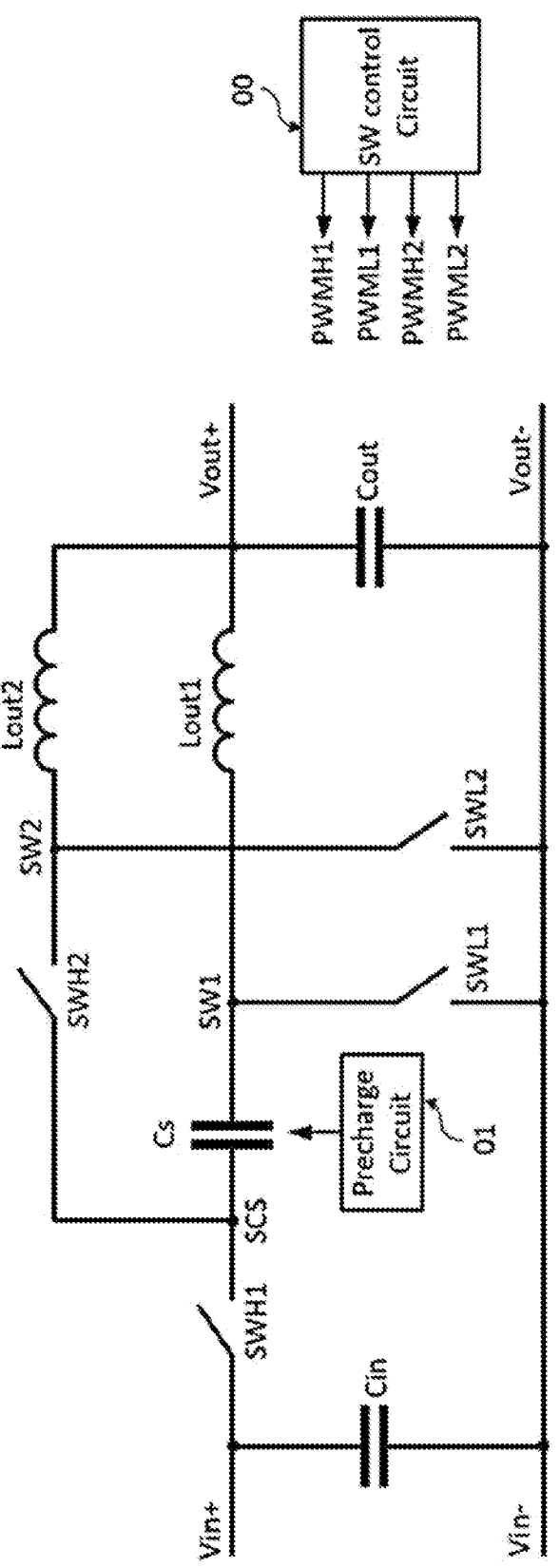
FIG. 1 is a schematic structural diagram of a series capacitor buck converter according to an exemplary implementation of the present disclosure.

FIG. 1 shows a schematic circuit diagram of a series capacitor buck converter. As an embodiment, a series capacitor buck converter with a precharge circuit includes input ends Vin+, Vin−; an input capacitor Cin; switch devices SWH1, SWL1, SWH2, SWL2; a series capacitor Cs; output inductors Lout1, Lout2; an output capacitor Cout; output ends Vout+, Vout−; and a switch control unit (SW-controlCircuit) 00 and a capacitor precharge circuit (Pre-chargeCircuit) 01. SWH1, Cs and SWL1 are connected in series to form a first half bridge unit, which has two nodes SCS and SW1; SWH2 and SWL2 are connected in series to form a second half bridge unit, which has a node SW1; SWH1 and SWL1 of the first half bridge are respectively connected to the input ends Vin+ and Vin−, and SWH2 and SWL2 of the second half bridge are respectively connected to SCS and Vin−; one end of the output inductors Lout1 and Lout2 is respectively connected to SW1 and SW2, and the other end thereof is connected together to Vout+; the input capacitor Cin and the output capacitor Cout are respectively connected to an input end and an output end, and the negative electrodes of the input and output ends are connected together.

Figure 2:
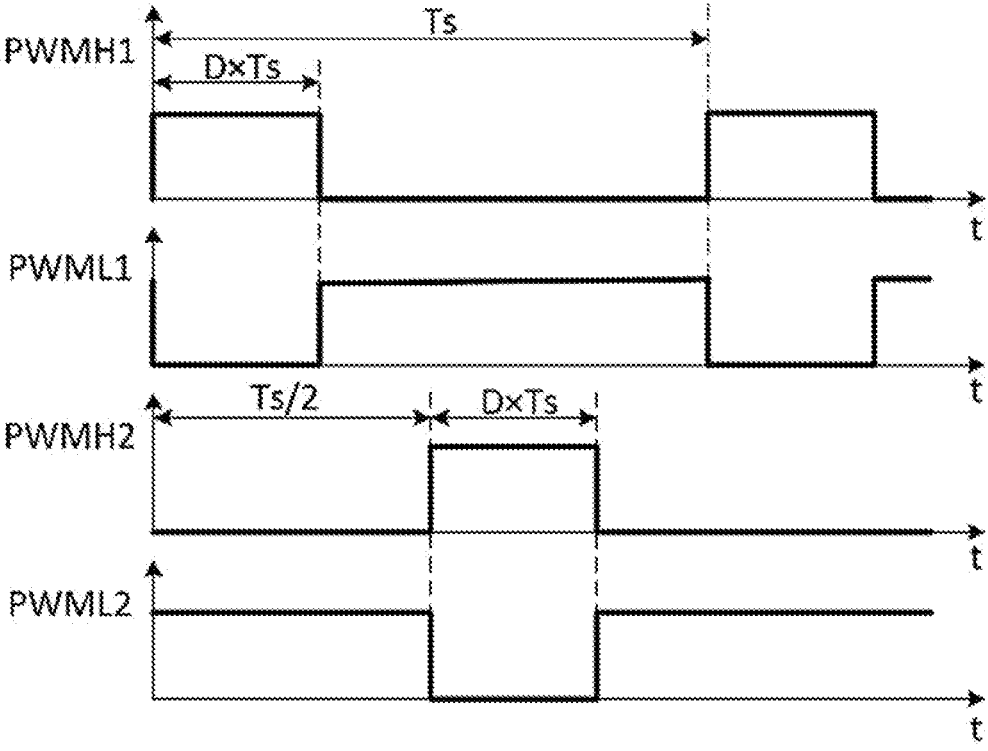
FIG. 2 is a schematic timing control diagram corresponding to the series capacitor buck converter shown in FIG. 1.

In addition, the switch control unit 00 may provide four paths of PWM signals for controlling the switch on and off of the switch device. FIG. 2 is a schematic waveform diagram of four paths of PWM signals. Specifically, PWMH1 and PWML1 respectively control SWH1 and SWL1, and PWMH2 and PWML2 respectively control SWH2 and SWL2. PWML1 is complementary to PWMH1, PWML2 is complementary to PWMH2, and PWMH2 is 180° phase shifted from PWMH1.

Figure 3:
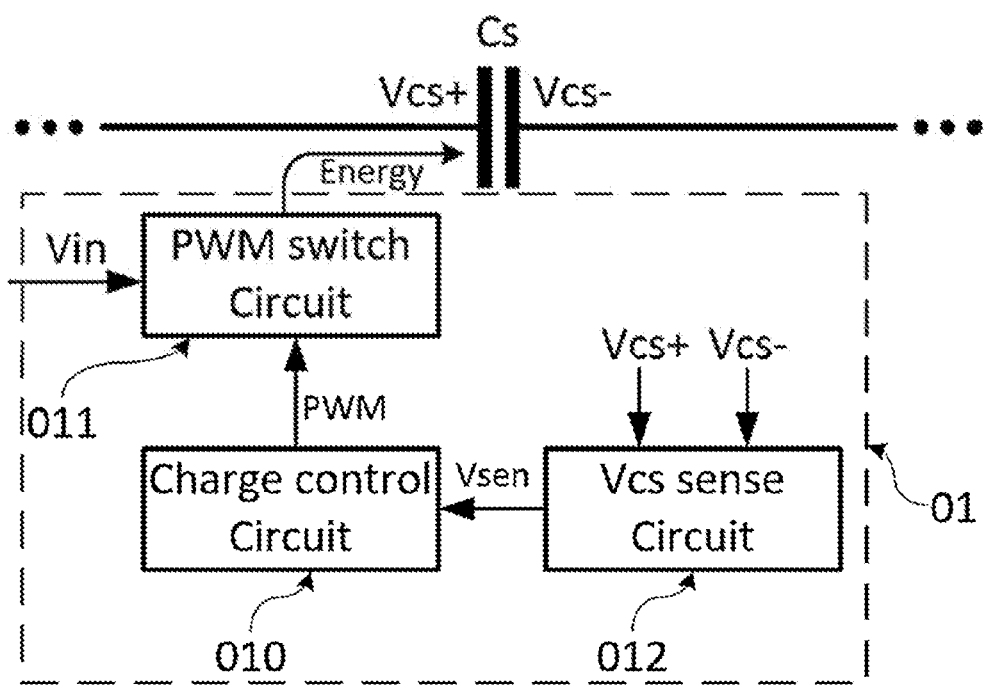
FIG. 3 is a schematic structural diagram of a capacitor precharge circuit according to an exemplary implementation of the present disclosure.

FIG. 3 shows a schematic circuit diagram of a capacitor precharge circuit 01. Since the series capacitor of the series capacitor buck converter is subjected to a voltage of Vin/2, the operating voltage of the actual power conversion circuit is reduced to half of the input voltage, so that D is doubled, which effectively solves the above-mentioned problem. Before the series capacitor buck converter works normally, the voltage at both ends of the series capacitor needs to be pre-charged to Vin/2, so a precharge circuit needs to be used to precharge the series capacitor in an appropriate manner.

As an embodiment, the capacitor precharge circuit 01 mainly includes a charge control circuit (ChargecontrolCircuit) 010, a charge switch circuit (PWMswitchCircuit) 011, and a capacitor voltage detection circuit 012 (VcssenseCircuit). After the voltage at both ends of the series capacitor Cs is processed by the capacitor voltage detection circuit 012, a voltage signal Vsen is output to the charge control circuit, and the output voltage signal may be an analogue signal reflecting the magnitude of the capacitor voltage, and may also be a level signal reflecting whether the capacitor voltage reaches a target value; the charge control circuit outputs at least one path of PWM signal according to the input Vsen signal, and the output of the PWM signal is divided into two stages: before the capacitor voltage reaches the target value, the charge control circuit sends out the PWM signal, and when the capacitor voltage reaches the target value or exceeds the target value, the charge control circuit switches off the PWM signal; the switch device in the charge switch circuit is switched on or off according to the PWM signal output by the charge control circuit to form a charge path, and transfers energy from the input end of the converter into the series capacitor. In this embodiment, the precharge circuit is simple in structure, flexible and convenient in control.

Further, the switch unit in the charge switch circuit is a separate charge switch device, or is a multiplexing of switch devices in the power conversion unit during a precharge stage, or both. Since the power conversion unit and the switch unit may multiplex the charge switch circuit, only a few devices are needed to achieve the precharge circuit; by using PWM control, the precharge voltage of the series capacitor may be controlled accurately, and the large charge current may be suppressed.

Figure 4:
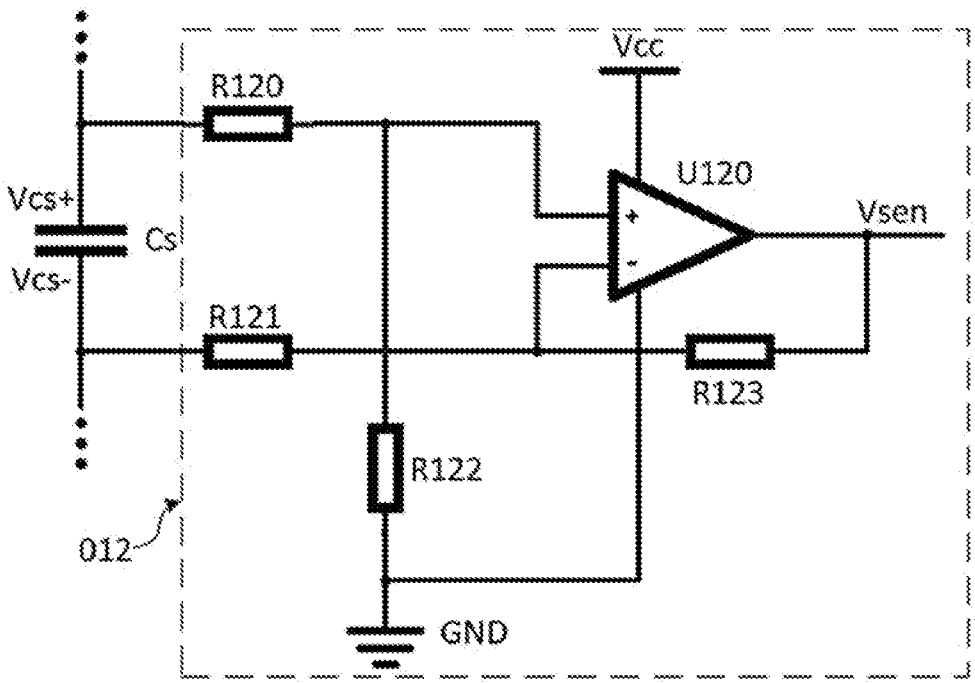
FIG. 4 is a schematic structural diagram of a capacitor voltage detection circuit according to an exemplary implementation of the present disclosure.
Figure 5:
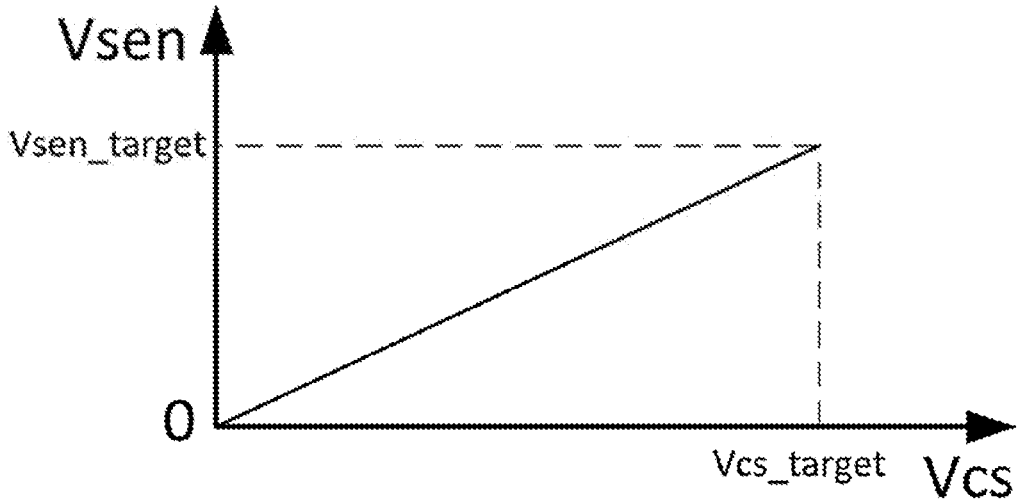
FIG. 5 is a schematic relationship diagram between the sampling output voltage and the capacitor voltage of the capacitor voltage detection circuit shown in FIG. 4.

FIG. 4 shows an alternative implementation of the capacitor voltage detection circuit. After being sampled by the sampling network of R120, R121 and R122, the voltage Vcs at both ends of the capacitor is sent to the input end of U120 operational amplifier. The feedback resistor R123 is connected to the negative output end and the negative input end of the operational amplifier to form a negative feedback circuit. The voltage Vsen at the output end of the operational amplifier may reflect the magnitude of the capacitor voltage Vcs. If R120=R121=R1 and R122=R123=R2, Vsen=Vcs× R2/R1, as shown in FIG. 5, at this moment, Vsen is an analogue voltage signal proportional to the voltage magnitude of Vcs. When Vcs is a target value Vcs_target, then Vsen is Vsen_target.

Figure 6:
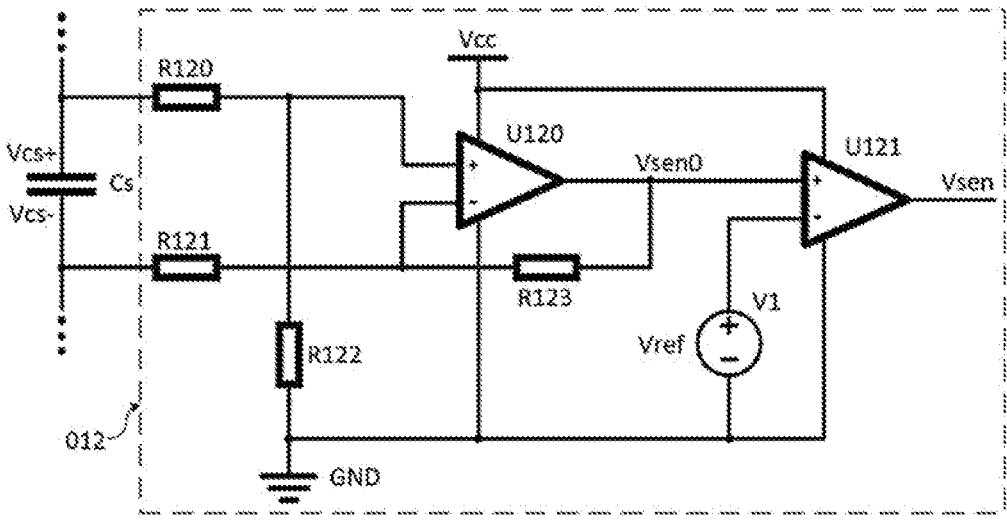
FIG. 6 is a schematic structural diagram of a capacitor voltage detection circuit according to another exemplary implementation of the present disclosure.

FIG. 6 shows another alternative implementation of the capacitor voltage detection circuit. After the circuit shown in FIG. 4 is added with a comparator U121 and a voltage source V1, when the sampling output voltage Vsen0 of the operational amplifier is less than the voltage of the voltage source V1, the comparator U121 outputs a signal Vsen with a low level, otherwise, the Vsen outputs a signal with a high level. As shown in FIG. 6, when Vcs is less than the target value Vcs_target, the voltage Vsen0 is less than Vref, and Vsen is a low level; and when Vcs is greater than the target value Vcs_target, the voltage Vsen0 is greater than Vref, and Vsen is a high level, and at this moment, the level signal of Vsen may reflect whether the capacitor voltage Vcs reaches the target value.

In order to prevent the false triggering of Vsen signal caused by the capacitor voltage Vcs jittering around Vcs_target in the circuit of FIG. 5, a return difference circuit may be added to solve this problem. When Vcs is greater than Vcs_target_H, Vsen is high; when Vcs is less than Vcs_target_L, Vsen is low. The difference between Vcs_target_H and Vcs_target_L is a return difference voltage. The specific circuit will not be described in detail herein.

Figure 8:
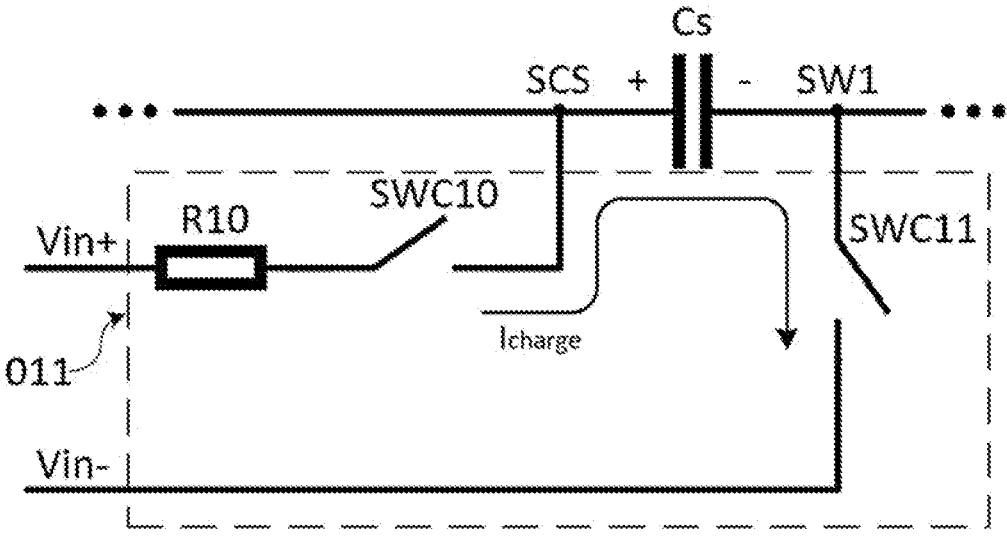
FIG. 8 is a schematic structural diagram of a charge switch circuit according to an exemplary implementation of the present disclosure.

FIG. 8 shows an alternative implementation of a charge switch circuit. An input end Vin+ is connected in series with a current limiting resistor R10 and a first charge switch device SWC10, and then connected to a SCS node at one end of a series capacitor Cs, and a second charge switch device SWC11 is connected between a SW1 node at the other end of Cs and Vin−. When the switch devices SWC10 and SWC11 are switched on, the charging current Icharge charges the capacitor Cs via R10, SWC10 and SWC11, and stores energy from the input end into Cs, so that the voltage Vcs rises; when SWC10 and SWC11 are switched off, the charging path is cut off and the voltage Vcs remains substantially constant. The charge control circuit only needs to control the PWM signal of the two switches to charge the voltage Vcs to a predetermined target value. In this implementation, the charge switch device SWC11 is connected in the same manner as the buck converter switch device SWL1 in FIG. 1, and the two may be combined into one device, and are controlled by the charge switch circuit 010 in the precharge stage and controlled by the switch control unit 00 in the power conversion stage. Moreover, the PWM signals of the two switch devices SWC10 and SWC11 controlled in the precharge stage are the same, and the charge control circuit only needs to output one PWM signal.

Figure 7:
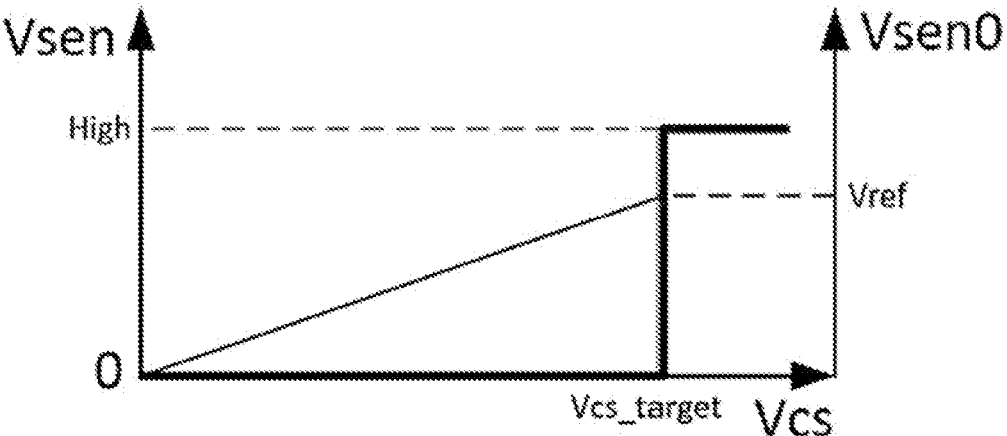
FIG. 7 is a schematic relationship diagram between the sampling output level and the capacitor voltage of the capacitor voltage detection circuit shown in FIG. 6.
Figure 9:
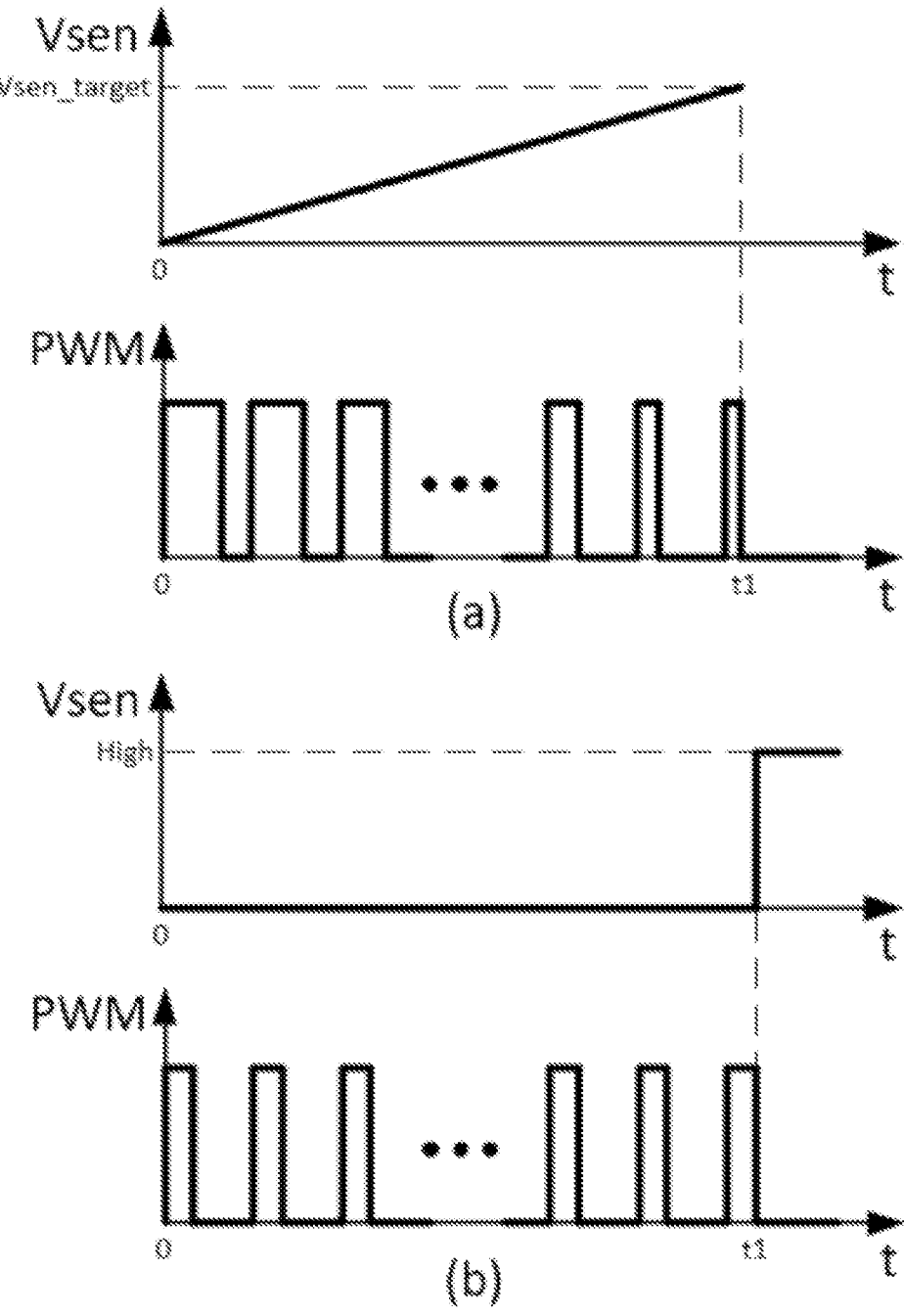
FIG. 9 is a schematic timing control diagram corresponding to the charge switch circuit shown in FIG. 8.

FIG. 9 is a schematic waveform diagram of PWM for controlling the switch circuit of FIG. 8. The control method of the charge control circuit varies depending on the input signal Vsen. When the input signal Vsen of the charge control circuit is an analogue voltage signal as shown in FIG. 5, the control circuit may output the PWM waveform according to the error between the current voltage Vsen and the target value Vsen_target, the greater the error is, the greater the duty cycle of the output PWM is, and at time t1, the voltage Vsen is equal to the target value Vsen_target, and the PWM output is switched off. The PWM waveform of this control method is shown in FIG. 9(a). At this moment, the control circuit may adopt proportional control or other closed loop control mode. When the input signal Vsen of the charge control circuit is the level signal shown in FIG. 7, PWM may be output in an open loop control mode. The control circuit outputs PWM with a fixed duty cycle when the Vsen level is low; and PWM is switched off when the Vsen level goes high at time t1. The PWM waveform of this open loop control is shown in FIG. 9(b).

Figure 10:
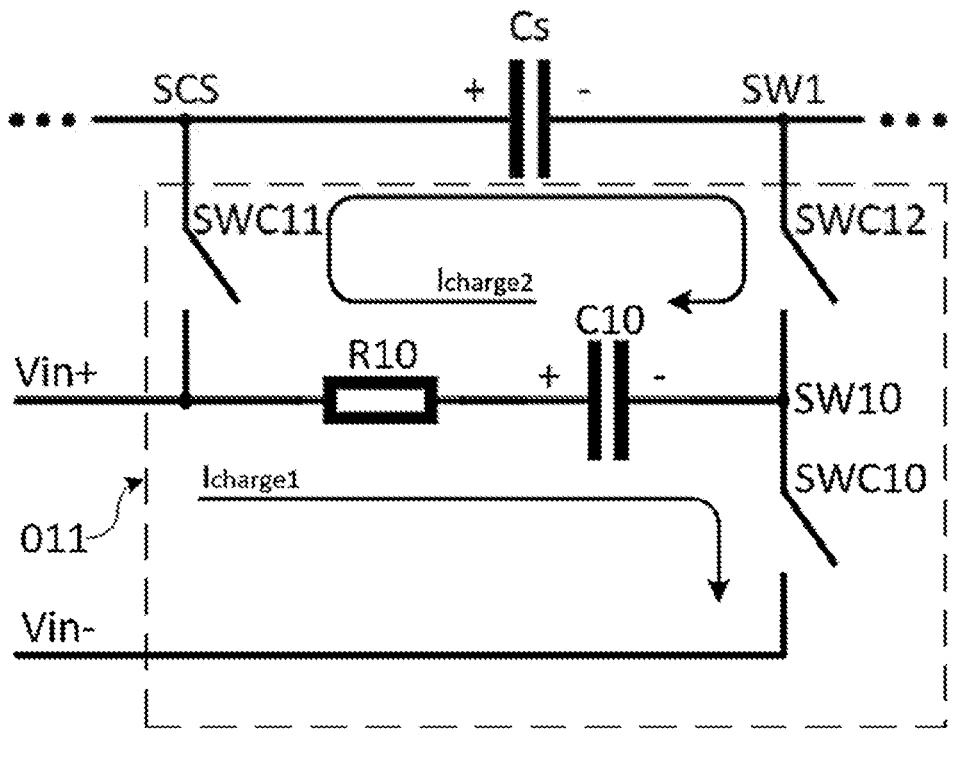
FIG. 10 is a schematic structural diagram of a charge switch circuit according to another exemplary implementation of the present disclosure.

FIG. 10 is another alternative implementation of a charge switch circuit. An input end Vin+ is connected in series with a current limiting resistor R10, an auxiliary capacitor C10, a first charge switch device SWC10 and an input end Vin−, wherein a connection node between C10 and SWC10 is SW10; a second charge switch device SWC11 is connected between the Vin+ and SCS nodes, and a third charge switch device SWC12 is connected between the SW1 node and the SW10 node. When the switch device SWC10 is switched on, and SWC11 and SWC12 are switched off, the auxiliary charge current Icharge1 charges the auxiliary capacitor C10 via R10 and SWC10, and stores energy from the input end into C10, and at this moment, the voltage Vcs remains substantially constant; when SWC10 is switched off and SWC11 and SWC12 are switched on, the charge current Icharge2 charges the capacitor Cs via R10, SWC11 and SWC12, and transfers energy stored in the auxiliary capacitor C10 to Cs, so that the voltage Vcs rises, which may also achieve the purpose of precharging Cs. In this implementation, the charge control circuit needs to output two paths of PWM signals to control SWC10, SWC11 and SWC12, and the two paths of PWM signals cannot make the charge switch device on at the same time. In this implementation, the charge switch device SWC11 is connected in the same manner as the buck converter switch device SWH1 in FIG. 1, and the two may be combined into one device, and are controlled by the charge switch circuit 010 in the precharge stage and controlled by the switch control unit 00 in the power conversion stage.

Figure 11:
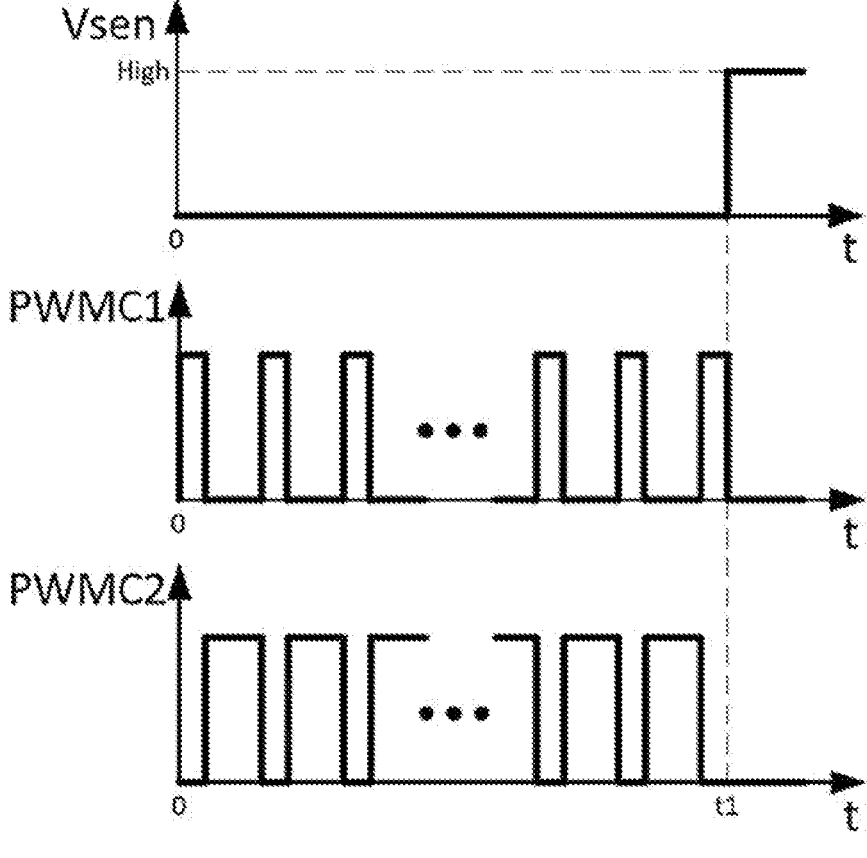
FIG. 11 is a schematic timing control diagram corresponding to the charge switch circuit shown in FIG. 10.

FIG. 11 is a schematic waveform diagram of PWM for controlling the switch circuit of FIG. 10. PWMC1 is a master PWM for controlling SWC10, PWMC2 is a slave PWM for controlling SWC11 and SWC12, and PWMC2 and PWMC1 are in a complementary relationship. When PWMC1 and PWMC2 work for one cycle, the energy may be transferred from the input end to the auxiliary capacitor C10 and then to the series capacitor Cs, to raise the voltage Vcs. When the Vsen signal reaches the target value at time t1, the charge control circuit switches off the two paths of PWM signals. Similar to the waveform control method shown in FIG. 9, the duty cycle of PWMC1 may be either a fixed value or a variable value subject to the closed loop control; the output requirements of PWMC2 and PWMC1 are that they cannot be switched on at the same time, and the specific duty cycle of PWMC2 may be complementary to PWMC1, or may be a fixed value, or may change with the value of PWMC1, etc.

While the foregoing is directed to the preferred implementations of the present disclosure, it is to be understood that the present disclosure is not limited thereto. Any modifications and variations will readily occur to those skilled in the art, which are within the scope of the present disclosure, all are intended to be within the scope of the present disclosure.

It should be appreciated that in the foregoing description of exemplary embodiments of the present disclosure, various features of the present disclosure are sometimes described in a single embodiment or with reference to a single figure in order to streamline the present disclosure and assist those skilled in the art in understanding the various aspects of the present disclosure. However, the present disclosure should not be interpreted as including in the exemplary embodiments all the features essential to the patent claims.

It will be appreciated by those skilled in the art that implementing all or part of the processes of the above-described embodiments may be accomplished by a computer program instructing associated hardware, which may be stored in a computer-readable storage medium. Wherein, the computer-readable storage medium is a magnetic disk, an optical disk, a read-only memory or a random access memory, etc.

It should be appreciated that modules, units, components, etc. included in a device of an embodiment of the present disclosure may be adaptively changed to be provided in a device different from the embodiment. Different modules, units or components included by the device of an embodiment may be combined into one module, unit or component, or they may be divided into a plurality of sub-modules, sub-units or sub-components.

What is claimed is:

1. A series capacitor buck converter with a precharge circuit, comprising:

a power conversion unit, comprising a first half bridge unit, a second half bridge unit, a series capacitor and an output inductor, wherein a first high side switch device unit, the series capacitor, and a first low side switch unit are sequentially connected in series to form the first half bridge unit, a connection point between the series capacitor and the first low side switch unit being a first switch node, and a connection point between the series capacitor and the first high side switch unit being a series capacitor node; a second high side switch device unit and a second low side switch unit are connected to form the second half bridge unit, a connection point between the second high side switch device unit and the second low side switch unit being a second switch node, the first high side switch unit and the second high side switch unit being respectively connected to an input positive electrode and the series capacitor node, and the first low side switch unit and the second low side switch unit being connected to an input negative electrode; one end of the first output inductor and a second output inductor is respectively connected to the first switch node and the second switch node, and the other end thereof is connected to an output positive electrode;

a switch control unit, configured to control a switch on and off of a switch unit in the power conversion unit to achieve power conversion, wherein the switch unit is any one of the fisrt low, the first high, the second low and the second high; and a capacitor precharge circuit, comprising a capacitor voltage detection circuit configured to detect a voltage at both ends of the series capacitor, and a capacitor charge circuit configured to precharge the series capacitor through a charge switch device in a pulse width modulation control mode;

wherein the capacitor charge circuit comprises a charge switch circuit and a charge control circuit, the charge control circuit outputting at least one path of control signals according to a signal provided by the capacitor voltage detection circuit, and controlling a switch on and off of a switch unit in the charge switch circuit in a pulse width modulation mode, so a voltage value at both ends of the series capacitor reach a target value; the charge control circuit varies depending on a input signal Vsen; when the input signal Vsen of the charge control circuit is an analogue voltage signal, the charge control circuit output a PWM waveform according to error between current voltage Vsen and target value Vsen_target, the greater the error is, the greater the duty cycle of the PWM waveform is, and at time t1, the current voltage Vsen is equal to the target value Vsen_target, and the PWM waveform is switched off.

2. The series capacitor buck converter with a precharge circuit according to claim 1, wherein the switch control unit controls a switch device unit by providing two groups of control signals, each group of control signals comprising two paths of control signals, and the two paths of control signals of each group being in a complementary relationship, wherein a first path of control signals of a first group of control signals are configured to control the first high side switch device unit, and a second path of control signals are configured to control the first low side switch device unit; a first path of control signals of a second group of control signals are configured to control the second high side switch device unit, and a second path of control signals are configured to control the second low side switch device unit, and the first path of control signals of the second group of control signals are 180° phase shifted from the first path of control signals of the first group of control signals, and the second path of control signals of the second group of control signals are 180° phase shifted from the second path of control signals of the first group of control signals.

3. The series capacitor buck converter with a precharge circuit according to claim 1, wherein the capacitor voltage detection circuit comprises a first resistor, a second resistor, a third resistor, an operational amplification circuit and a feedback resistor, one end of the first resistor being connected to a positive electrode of the series capacitor, and the other end being connected to one end of the third resistor and a positive input end of the operational amplification circuit, and the other end of the third resistor being grounded; one end of the second resistor being connected to a negative electrode of the series capacitor, and the other end being connected to a negative input end of the operational amplification circuit and one end of the feedback resistor, and the other end of the feedback resistor being connected to an output end of the operational amplifier.

4. The series capacitor buck converter with a precharge circuit according to claim 1, wherein the capacitor voltage detection circuit comprises a first resistor, a second resistor, a third resistor, an operational amplification circuit and a feedback resistor, one end of the first resistor being connected to a positive electrode of the series capacitor, and the other end being connected to one end of the third resistor and a positive input end of the operational amplification circuit, and the other end of the third resistor being grounded; one end of the second resistor being connected to a negative electrode of the series capacitor, and the other end being connected to a negative input end of the operational amplification circuit and one end of the feedback resistor, and the other end of the feedback resistor being connected to an output end of the operational amplifier.

5. The series capacitor buck converter with a precharge circuit according to claim 3, wherein the capacitor voltage detection circuit further comprises a comparator and a voltage source, a positive input end of the comparator being connected to an output end of the operational amplification circuit, a negative input end being connected to a positive electrode of the voltage source, and a negative electrode of the voltage source being grounded.

6. The series capacitor buck converter with a precharge circuit according to claim 4, wherein the capacitor voltage detection circuit further comprises a comparator and a voltage source, a positive input end of the comparator being connected to an output end of the operational amplification circuit, a negative input end being connected to a positive electrode of the voltage source, and a negative electrode of the voltage source being grounded.

7. The series capacitor buck converter with a precharge circuit according to claim 1, wherein an energy source for charging the charge switch circuit is from an input end of a power converter, and the charge switch circuit comprises at least one charge switch unit and a current limiting resistor, the current limiting resistor being connected in series with the charge switch unit and being configured to suppress a transient large current when the switch device is switched on.

8. The series capacitor buck converter with a precharge circuit according to claim 5, wherein the switch unit in the charge switch circuit is a separate charge switch device, or is a multiplexing of switch devices in the power conversion unit during a precharge stage, or both.

9. The series capacitor buck converter with a precharge circuit according to claim 6, wherein the switch unit in the charge switch circuit is a separate charge switch device, or is a multiplexing of switch devices in the power conversion unit during a precharge stage, or both.

10. The series capacitor buck converter with a precharge circuit according to claim 1, wherein the switch unit in the charge switch circuit is a separate charge switch device, or is a multiplexing of switch devices in the power conversion unit during a precharge stage, or both.

11. The series capacitor buck converter with a precharge circuit according to claim 1, wherein the target value of a voltage at both ends of the series capacitor is half of a voltage at an input end of the power converter.

* * * * *